United States Patent

Begeja et al.

[11] Patent Number: 5,859,908
[45] Date of Patent: Jan. 12, 1999

[54] METHOD AND APPARATUS FOR APPLYING MULTIPLE SPEECH PROCESSING FEATURES TO A TELEPHONE CALL

[75] Inventors: Lee Begeja, Gillette; Carroll W. Creswell, Basking Ridge; Daniel Selig Furman; Michael Joseph Haller, both of Summit; John A. McMaster, Basking Ridge, all of N.J.; John C. Songrady, Washington Crossing, Pa.; Thomas Wasilewski, Marlboro; Donald Joseph Youtkus, Scotch Plains, both of N.J.

[73] Assignee: AT&T Corp., Middletown, N.J.

[21] Appl. No.: 767,358

[22] Filed: Dec. 18, 1996

Related U.S. Application Data

[60] Provisional application No. 60/014,255 Mar. 28, 1996.
[51] Int. Cl.[6] .................................................. H04M 9/08
[52] U.S. Cl. ........................ 379/410; 379/406; 379/416; 370/286
[58] Field of Search ................................ 379/67, 88, 201, 379/387, 390–1, 406, 410, 142, 207, 211, 215, 216, 265–6, 355, 388, 395, 89, 409; 364/513.5; 704/225, 233, 243, 200, 207, 251; 455/563, 564, 570; 381/106, 108, 49, 68.2, 94.3, 94.7; 179/98; 367/93

[56] References Cited

U.S. PATENT DOCUMENTS

| | | | |
|---|---|---|---|
| 4,058,676 | 11/1977 | Wilkes et al. | 179/1 SA |
| 4,724,407 | 2/1988 | Miura et al. | 333/17 R |
| 5,123,048 | 6/1992 | Miyamae et al. | 381/41 |
| 5,195,132 | 3/1993 | Bowker et al. | 379/410 |
| 5,406,622 | 4/1995 | Silverberg et al. | 379/416 |
| 5,485,511 | 1/1996 | Iglehart et al. | 379/201 |
| 5,485,515 | 1/1996 | Allen et al. | 379/391 |
| 5,631,899 | 5/1997 | Duttweiler | 370/291 |
| 5,708,704 | 1/1998 | Fisher | 379/410 |
| 5,712,830 | 1/1998 | Ross et al. | 367/93 |

Primary Examiner—Scott Wolinsky

[57] ABSTRACT

A speech processor uses a plurality of speech processing features to enhance the quality of speech signals received by a user during a telephone call. The activation of a second speech processing feature is delayed for a time duration measured after the initiation of a particular call or measured after the activation of a first speech processing feature. This delay eliminates any interference between the second speech processing feature and the first speech processing feature that is active when the call is initiated. The delay also increases the time it takes for the speech processing features to become fully effective, thus making the enhancement in the quality of the speech signals more noticeable to the user. Further, an optionally generated audio indicator is provided when the second speech processing feature is applied so that the additional feature is even more noticeable to the user.

18 Claims, 2 Drawing Sheets

METHOD AND APPARATUS FOR APPLYING MULTIPLE SPEECH PROCESSING FEATURES TO A TELEPHONE CALL

CROSS-REFERENCES TO RELATED APPLICATIONS

This application claims the benefit of U.S. Provisional Application No. 60/014,255, filed Mar. 28, 1996.

BACKGROUND OF THE INVENTION

The present invention relates to enhancing the quality of speech in a telephone call and, more particularly, to a method and apparatus for applying multiple speech processing features to a telephone call.

It is well-known in the telecommunication art to apply speech processing features in a telephone network in order to enhance the quality of the speech signals. Some features provide virtually their full intended effect immediately upon activation. These features are referred to as "non-adaptive" and include, for example, pre-emphasis filters and equalizers. Other features, however, gradually and smoothly apply their effect, i.e., "ramp-up," following activation. These features are referred to as "adaptive" and include, for example, automatic gain control, background noise compensation, noise reduction and echo cancellation.

It is known that more than one speech processing feature can be applied in a telephone network. For example, U.S. Pat. No. 5,195,132 issued to Bowker et al. on Mar. 16, 1993 discloses utilizing both echo cancellation and digital filtering to enhance speech signal quality. However, a problem which heretofore has not been recognized in the telecommunication art arises when more than one speech processing feature is applied to a telephone network, especially with telephone networks using echo cancelers. This problem can be seen in FIG. 1 which shows a graph of a particular telephone call beginning at time to. Curve 8 represents echo cancellation on the network. As is known in the art, echo cancellation requires time following the start of a call to fully "ramp-up" or converge, and in FIG. 1 convergence of curve 8 occurs at time $t_1$. Curve 9 represents another adaptive process such as background noise compensation which takes a duration of time $t_2$ to ramp-up. A problem ensues throughout the duration of time $t_1-t_0$ when the ramp-up of both processes overlap. During this period the processes interfere with each other and the call quality is severely degraded. Therefore, there is a need for a technique for providing multiple speech processing features to a telephone network without having the call quality initially degraded.

Another problem with the techniques disclosed in the prior art for applying speech processing features to a telephone network involves the user's perception of the effect of these features. In the telecommunication industry, speech processing features have always been provided at the start of the call and the motivation of telecommunication system designers has always been to reduce the ramp-up time of the features so that the transition to full effectiveness of the features is least noticeable by the user. For example, U.S. Pat. No. 5,001,701 issued to Gay on Mar. 19, 1991 discloses using real-time allocation among subbands to achieve faster overall convergence of echo cancellation. However, we have found that if the speech processing features are provided right from the start of the call, with quick ramp-up time, the user may not attribute the higher quality call to the presence of the speech processing features. Therefore, there is a need to alert the user that speech processing features that enhance the speech signal quality are being applied to a particular call.

SUMMARY OF THE INVENTION

In accordance with embodiments of the present invention, the activation of a second speech processing feature is delayed for a time duration after the initiation of a particular call or after the activation of a first speech processing feature. This delay reduces or eliminates interference between the second speech processing feature and the first speech processing feature that is active when the call is initiated. The delay facilitates an improvement in initial call quality as compared with the prior art of contemporaneous application of speech processing features. The delay also increases the time it takes for the speech processing features to become fully effective, thus making the enhancement in the quality of the speech signals more noticeable to the user. Further, embodiments of the present invention may generate an audio indication when the second speech processing feature is applied so that the additional feature is even more noticeable to the customer.

The above-described features of the present invention are not found in the telecommunication art for at least two reasons. First, in previous systems, such as the system disclosed in U.S. Pat. No. 5,195,132, speech processing features are always running, regardless of whether any phone calls are carried by the network. This continuous running of speech processing features is antithetical to a delay of the initiation of a feature with respect to a particular call. Second, as previously discussed, it is counterintuitive to purposefully delay the implementation of speech processing features by a timing delay, or alert the customer that speech processing features are being implemented, because the conventional wisdom in the telecommunication art is to minimize as much as possible the intrusiveness and noticeability to the user of speech processing features.

DETAILED DESCRIPTION OF THE INVENTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 2 may be provided by a single shared processor. (Use of the term "processor" should not be construed to refer exclusively to hardware capable of executing software.)

Illustrative embodiments may comprise digital signal processor (DSP) hardware, such as the Lucent Technologies DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 1:
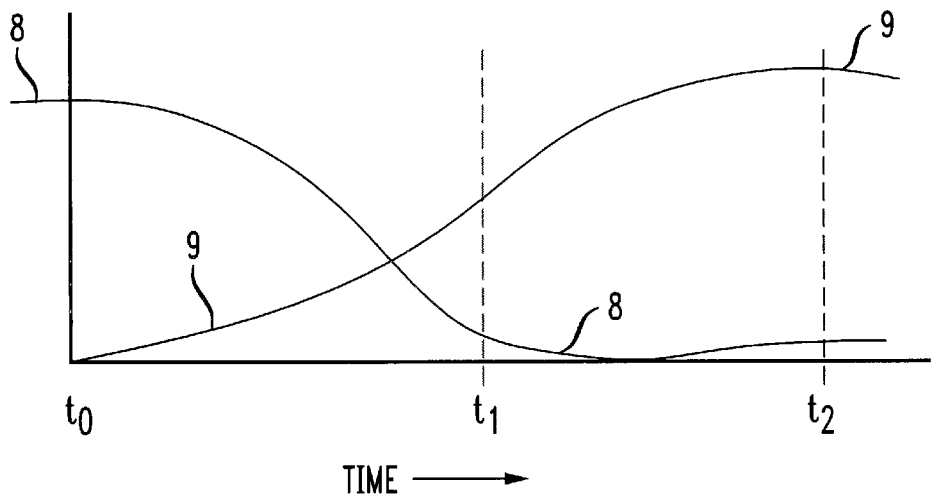
FIG. 1 is a graph illustrating two speech processing features overlapping.
Figure 2:
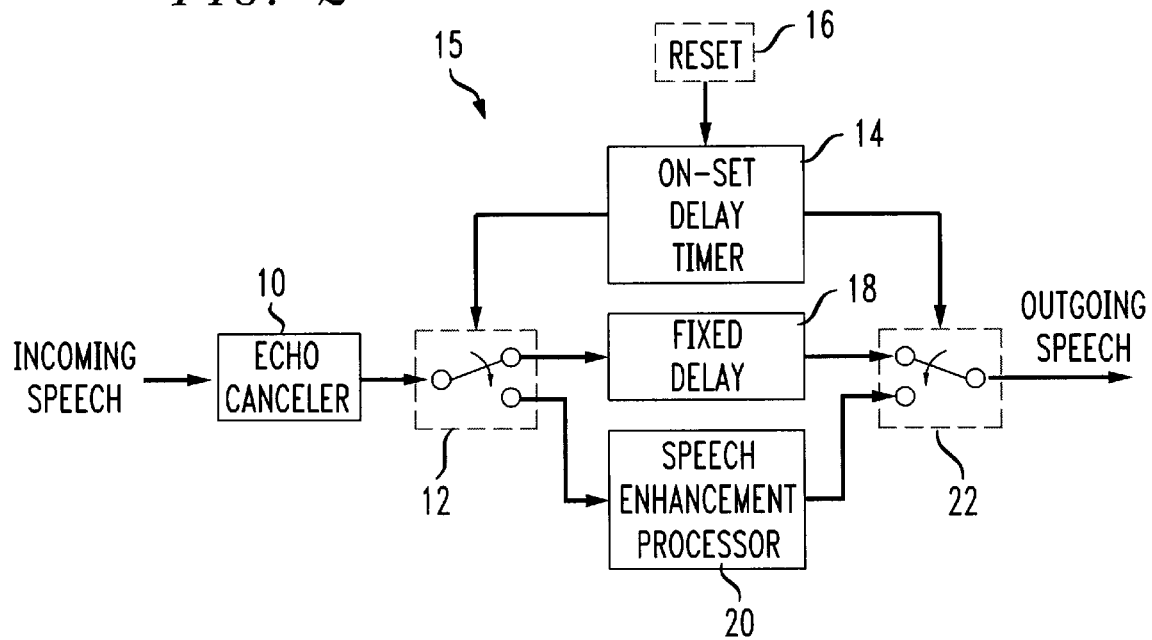
FIG. 2 is a block diagram of one embodiment of the speech processor of the present invention.

Referring in detail to the drawings, wherein like parts are designated by like reference numerals throughout, there is illustrated in FIG. 2 a block diagram of a speech processor 15 in accordance with an embodiment of the present invention. In FIG. 2, "incoming speech" refers to the speech signal prior to processing while "outgoing speech" refers to the speech signal following processing.

The speech processor 15 includes an echo canceler 10 coupled to a switch 12. The echo canceler 10 is also coupled to the incoming speech path and performs echo cancellation on the incoming speech. The switch 12 selectively couples the output of the echo canceler 10 to the input of either a fixed delay unit 18 or a speech enhancement processor 20. The speech enhancement processor 20 implements one or more speech processing algorithms for enhancing incoming speech. In one embodiment, the speech enhancement processor 20 performs background noise compensation on the incoming speech. The fixed delay unit 18 delays the speech path by an amount equal to the overall delay introduced by the speech enhancement processor 20. A switch 22 selectively couples the output of either the fixed delay unit 18 or the speech enhancement processor 20 to the outgoing speech path.

The speech processor 15 further includes a delay timer 14. The delay timer 14 is coupled to the switches 12, 22 and includes a reset input 16. The delay timer 14 can either configure the switches 12, 22 so that they both are coupled to the fixed delay unit 18 (the "first position"), or so that they both are coupled to the speech enhancement processor 20 (the "second position"). When a reset signal is received by the reset input 16, the delay timer 14 waits for a fixed period of time until it expires and then configures the switches 12, 22 to the second position.

A telephone call is initiated for the purposes of the speech processor 15 after the calling party has completed dialing. The switches 12, 22 are initially configured in the first position before the call is initiated. A reset signal is either sent to the reset input 16 when a call is initiated, or when the calling party has answered the call. The incoming speech is initially routed through the echo canceler 10 and the fixed delay unit 18. Therefore, initially the outgoing speech will only have echo cancellation applied to it. When the delay timer 14 expires, switches 12, 22 are switched to the second position and the incoming speech is routed through both the echo canceler 10 and the speech enhancement processor 20. Therefore, after the delay timer 14 expires, the outgoing speech has both echo cancellation and background noise compensation applied to it.

The amount of time that the delay timer 14 waits until it expires is set so that the echo cancellation has fully converged before the background noise compensation is initiated. In one embodiment, if the reset signal is sent to the reset input 16 when the call is initiated, the delay timer 14 is set to expire in approximately 55 seconds; if the reset signal is sent to the reset input 16 when the called party has answered the call, the delay timer 14 is set to expire in approximately 7 seconds.

Figure 3:
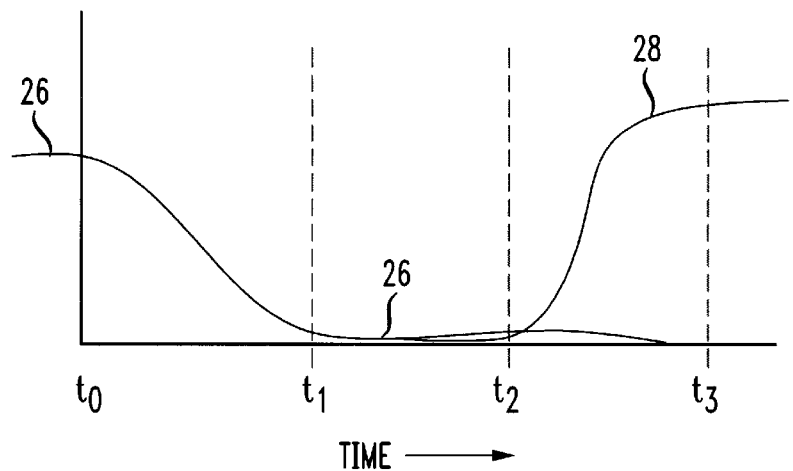
FIG. 3 is a graph illustrating two speech processing features applied to speech signals using the present invention.

FIG. 3 is a graph of a telephone call initiated at time $t_0$ using the speech processor 15. Curve 26 represents echo cancellation applied to the speech signal by echo canceler 10. The convergence of curve 26 occurs at approximately time $t_1$. At time $t_2$, delay timer 14 expires, and the speech enhancement processor 20 applies background noise compensation, represented by curve 28, to the speech signal. Curve 28 fully ramps-up at approximately time $t_3$.

As shown in FIG. 3, by delaying the application of the background noise compensation until time $t_2$, the echo cancellation is allowed to fully converge and overlap of the two speech processing features is avoided. In addition, the full effect of the background noise compensation is delayed until time $t_3$, so that the full enhancement of the speech signals is more noticeable to the user because it occurs more slowly.

Figure 4:
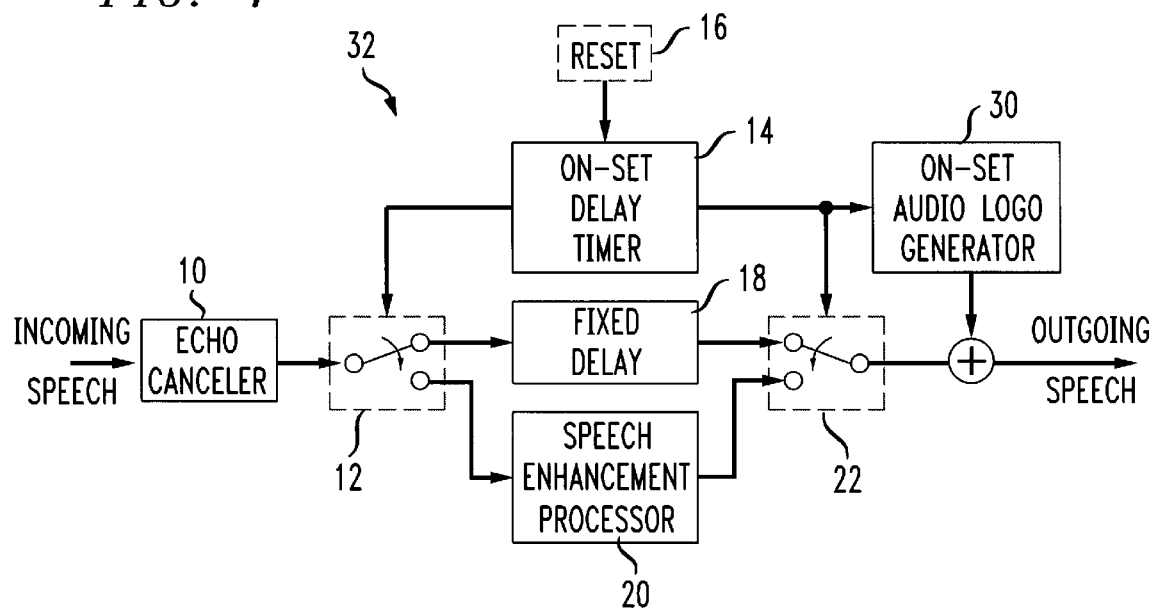
FIG. 4 is a block diagram of another embodiment of the speech processor of the present invention.

FIG. 4 is a block diagram of a speech processor 32 in accordance with another embodiment of the present invention. The speech processor 32 is identical to the speech processor 15 shown in FIG. 2, except the speech processor 32 includes a audio logo generator 30 coupled to the delay timer 14 and the outgoing speech path. The audio logo generator 30, when it is triggered by the expiration of the delay timer 14, generates an audio logo and adds it to the outgoing speech. The audio logo alerts the user that the speech enhancement processor 20 is being applied to the call, so that the effect of the speech processing feature is more noticeable to the user.

Each component of the present invention has been shown in block diagram form to facilitate clarity of the invention. The functionality of each component can be implemented by conventional equipment that is known to persons of ordinary skill in the art. In addition, what has been described is merely illustrative of the application of the principles of the present invention. Other arrangements and methods can be implemented by those skilled in the art without departing from the spirit and scope of the present invention.

For example, application of a second speech processing feature may be initiated as a result of a signal indicating convergence of a first speech processing feature, rather than by expiration of a delay timer which is intended to cover the time convergence of the first feature is expected to take. Also, initiation of both the first and second speech processing features may be under the control of a timing system which provides for the delay in accordance with the present invention. It should be realized that the second speech processing feature may be initiated prior to convergence of the first speech processing feature. However, this may increase the interference between features when compared with waiting for complete convergence of the first feature. Thus the delay may reduce but not eliminate feature interference.

What is claimed is:

1. A method of gradually enhancing the quality of speech signals generated by a first user and received by a second user during a telephone call such that the enhanced quality of the speech signals is more noticeable to the second user, the method comprising the steps of:

upon initiation of the telephone call, applying a first speech enhancement processing feature to the speech signals generated by the first user for a predetermined time period, wherein said first speech processing feature converges during said predetermined time period; and in response to an expiration of said predetermined time period, applying both the first speech enhancement processing feature and a second speech enhancement processing feature to the speech signals generated by the first user during the remainder of the telephone call.

2. The method of claim 1, further comprising the step of: sending an audio alert to the second user at said expiration of said predetermined time period.

3. The method of claim 1, wherein said first speech enhancement processing feature is echo cancellation and said second speech enhancement processing feature is background noise compensation.

4. The method of claim 1, further comprising the step of;
delaying the time the speech signals are received by the second user during said predetermined time period.

5. The method of claim 1, wherein said predetermined time period is measured from when the telephone call is initiated.

6. The method of claim 1, wherein said predetermined time period is measured from when the second user has answered the telephone call.

7. A speech processor for gradually enhancing the quality of speech signals generated by a first user and received by a second user during a telephone call such that the enhanced quality of the speech signals is more noticeable to the second user, the speech processor comprising
- a first speech enhancement processor; and
- a second speech enhancement processor selectively coupled to said first speech enhancement processor;
- wherein upon initiation of the telephone call, said first speech enhancement processor applies a first speech enhancement processing feature to the speech signals generated by the first user for a predetermined time period, wherein said first speech processing feature converges during said predetermined time period; and
- in response to an expiration of said predetermined time period, said second speech enhancement processor applies a second speech enhancement processing feature and said first speech enhancement processor applies the first speech enhancement processing feature to the speech signals generated by the first user during the remainder of the telephone call.

8. The speech processor of claim 7, further comprising:
an audio alert generator selectively coupled to said second speech enhancement processor that sends an audio alert to the second user at said expiration of said predetermined time period.

9. The speech processor of claim 7, wherein said first speech enhancement processing feature is echo cancellation and said second speech enhancement processing feature is background noise compensation.

10. The speech processor of claim 7, further comprising:
a delay unit selectively coupled to said second speech enhancement processor that delays the time the speech signals are received by the second user during said predetermined time period.

11. The speech processor of claim 7, wherein said predetermined time period is measured from when the telephone call is initiated.

12. The speech processor of claim 7, wherein said predetermined time period is measured from when the second user has answered the telephone call.

13. A speech processing system for gradually enhancing the quality of speech signals generated by a first user and received by a second user during a telephone call such that the enhanced quality of the speech signals is more noticeable to the second user, said system comprising:
- means for applying, upon initiation of the telephone call, a first speech enhancement processing feature to the speech signals generated by the first user for a predetermined time period, wherein said first speech processing feature converges during said predetermined time period; and
- means for applying, in response to an expiration of said predetermined time period, both the first speech enhancement processing feature and a second speech enhancement processing feature to the speech signals generated by the first user during the remainder of the telephone call.

14. The speech processing system of claim 13, further comprising:
means for sending an audio alert to the second user at said expiration of said predetermined time period.

15. The speech processing system of claim 13, wherein said first speech enhancement processing feature is echo cancellation and said second speech enhancement processing feature is background noise compensation.

16. The speech processing system of claim 13, further comprising:
means for delaying the time the speech signals are received by the second user during said predetermined time period.

17. The speech processing system of claim 13, wherein said predetermined time period is measured from when the telephone call is initiated.

18. The speech processing system of claim 13, wherein said predetermined time period is measured from when the second user has answered the telephone call.

* * * * *